UNITED STATES PATENT OFFICE.

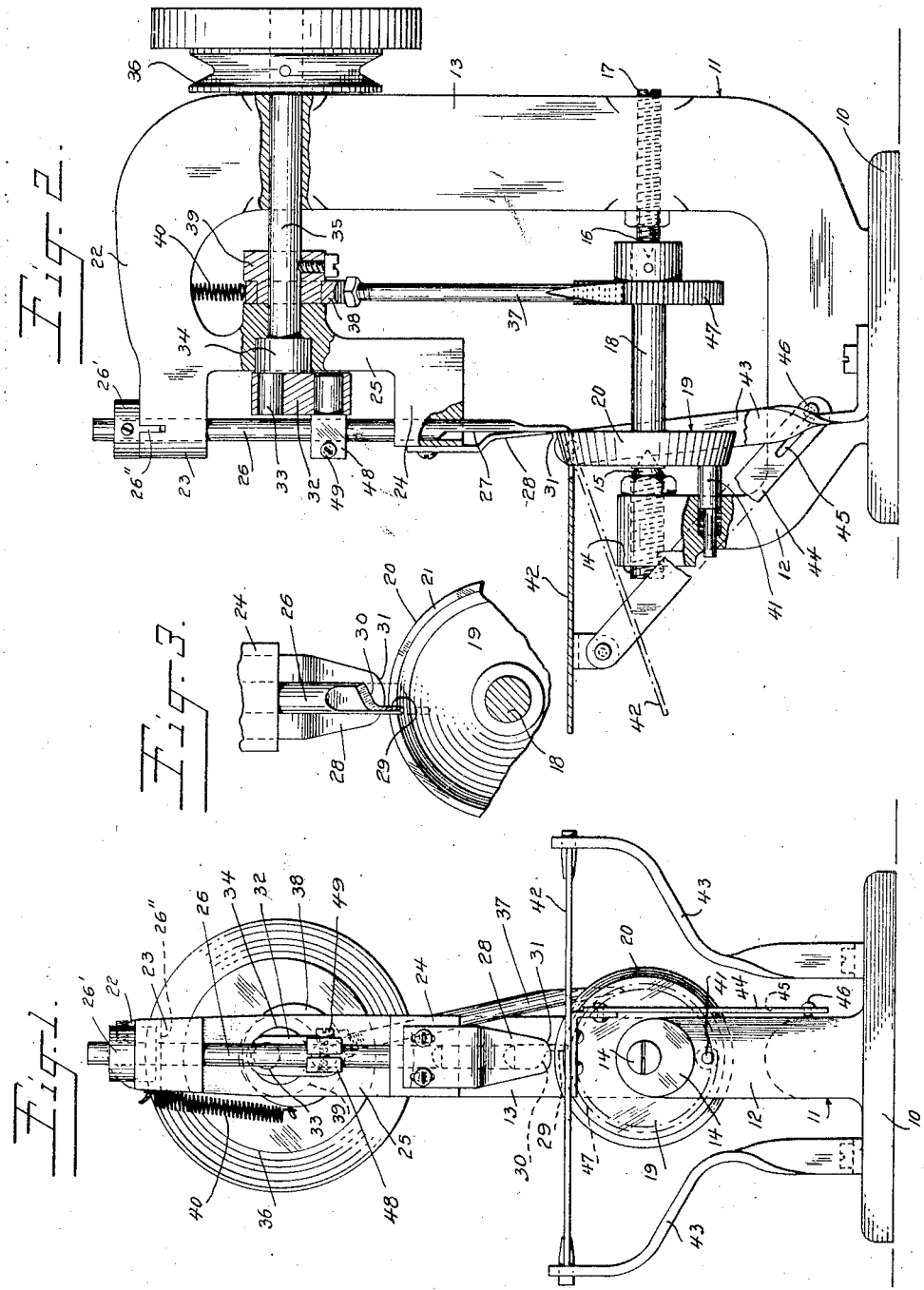

THOMAS B. HUESTIS, OF BRISTOL, RHODE ISLAND, ASSIGNOR TO NATIONAL INDIA RUBBER COMPANY, A CORPORATION OF RHODE ISLAND.

HEEL-TRIMMER.

1,382,642.  Specification of Letters Patent.  Patented June 28, 1921.

Application filed December 18, 1919. Serial No. 345,787.

*To all whom it may concern:*

Be it known that I, THOMAS B. HUESTIS, a citizen of the United States, residing at Bristol, in the county of Bristol and State of Rhode Island, have invented new and useful Improvements in Heel-Trimmers, of which the following is a full, clear, and exact description.

This invention relates to cutting machines in general and more especially to machines for cutting or severing material such as rubber or the like.

In the manufacture of rubber articles such as rubber heels that are shaped by complemental mold members, a flash or fin usually results at the meeting edges of the mold members. This flash must subsequently be cut off. Among the main objects of the present invention, it is aimed to provide a machine for efficiently trimming off the flash so formed. To this end the invention contemplates certain novel features of construction.

Specifically the invention contemplates an adjustable supporting table, an intermittently actuated feed guiding member, a stripper and a vertically reciprocable cutting tool.

The invention still further contemplates the provision of a vertically operating cutting tool coöperating with an intermittently actuated feed guiding member which is stationary when the cutting tool is caused to function, such guiding member serving both to advance the work and also constantly to renew the cutting edge of the cutting tool.

These and other features, capabilities and advantages of the invention will appear from the subjoined detail description of one specific embodiment thereof illustrated in the accompanying drawings, in which:

Figure 1 is an end elevation of the complete device.

Fig. 2 is a side elevation of the same, partly in section.

Fig. 3 is an enlarged fragmental view showing the operative relation between the cutting tool, stripper and feed guiding member.

In the embodiment shown there is provided a base 10 from which rises the main frame 11. This frame 11 comprises essentially a short upright arm 12 and a long upright arm 13 spaced from one another. In the upper end of the upright arm 12 there is secured the pivot bearing 14 terminating in the conical pivot 15 which is disposed in alinement with the conical pivot 16 formed on the pivot bearing 17 secured in the upright arm 13. The shaft 18 is mounted on the pivots 15 and 16. On the shaft 18 adjacent to the pivot 15 there is secured a feed guiding member, or flanged wheel 19 which consists essentially of a disk having a conical flange 20 extending from the periphery thereof and flaring outwardly in the direction of the arm 13. The edge of the flange is provided with a narrow finished face 21 extending radially of the shaft 18 and functioning as an edge renewing or sharpening tool. The arm 13 has a horizontal extension 22 in the end portion 23 of which there is formed a bore or vertical guide-way in alinement with a similar bore or vertical guide-way formed in the portion 24 extending laterally from the depending portion 25. In the guide-ways formed in the portions 23 and 24 there is reciprocably mounted the stem 26, having a flat face 27 to coöperate with the guide plate 28 secured to the portion 24. The lower end of the stem 26 comprehends the cutting tool which has a leading cutting edge 29 and an inclined main cutting edge 30. The guide plate 28 has a lower rounded sharp edge 31. The flat face 27 is adapted to reciprocate across the face 21 of the feeding member 19 and the guide plate 28 whereby the cutting edge of the tool will be continually renewed. The stem 26 is prevented from turning about its own axis by a collar 26' fastened thereto with an integral fin 26'' slidable in a correspondingly shaped slot in the frame.

For reciprocating the stem 26 and therewith the cutting tool, the stem 26 is connected by the link 32 with the eccentric stud 33 formed on the enlargement 34 of the drive shaft 35 which is rotatably mounted by and extends through the depending portion 25 and the arm 13. To the shaft 35 is secured the pulley 36 to receive a belt for driving the shaft.

For actuating the feeding member 19, the ratchet wheel 47, which is fixed to the shaft 18, is intermittently actuated by the pawl 37, the upper end of which is provided with a ring 38 mounted on the eccentric 39 secured to the shaft 35. For urging the active end of the pawl 37 in contact with the ratchet wheel 47, the spring 40 is provided which connects the ring 38 with the extension 22. The means for actuating the feeding member 19 and the cutting tool are so timed that the feeding member will remain stationary when the cutting tool descends and rotate when the cutting tool ascends. To bring about this result, the cutting tool by means of an eccentric connection is continually reciprocated, and the feeding member by means of its pawl connection is intermittently rotated.

To prevent the feeding member 19 from rotating freely except when actuated by the pawl 37, a suitable friction finger 41 is provided which is resiliently mounted in the arm 12 so that it engages the outer face of the feeding member 19.

For supporting the work, a rubber heel or the like, in proper relation to the cutting tool, a supporting table 42 is provided which is pivotally secured at its rear end to the brackets 43 extending upwardly from the base 10. In order to permit adjusting the angle of the table relatively to the cutting tool, the link 44 is provided and it is pivotally connected at one end to the table 42 and at the other end provided with a stepped slot 45 for coöperating with the pin 46 secured to the frame 11.

The link 32 is connected to the stem 26 by the two-part bushing 48 secured in place by the screw 49. By this connection, it will be seen, the stem may be adjusted vertically, and thereby the stroke of the cutting tool adjusted.

In the operation of the device, the fin to be severed is fed under the plate 28, so that the work will partly rest on the feed guiding member 19, then upon the work having been fed into engagement with the cutting tool, the fin will be intermittently cut with the descent of the cutting tool and the work advanced by the guiding member. The guide plate 28 serves not only as a stripper in the cutting operation, but also to anchor the cutting tool against radial displacement, to facilitate guiding the fin into engagement with the cutting tool and to renew the cutting edge of the tool.

It will be obvious from a glance at the drawings that the member 19 has four-fold utility. It functions as a ledger blade in coöperating with the knife or cutting member. It functions as a work support for the material being trimmed. It intermittently advances the work and therefore functions as a feed device. And by presenting different portions of the surface 21 to the cutter on successive reciprocations of the latter, it serves as a sharpener.

It is obvious that various changes and modifications may be made to the details of construction without departing from the general scope of the invention.

Having thus described my invention, what I claim and desire to protect by Letters Patent is:

In a shearing machine, in combination, a rotatable feeding ledger and work-supporting member, a reciprocable cutting member in coöperating working relation therewith, a main shaft, a secondary shaft parallel to the main shaft and supporting the feeding ledger and work supporting member, a ratchet on said secondary shaft, means for operating the cutter and feeding ledger and work supporting members from the main shaft including eccentric elements on the main shaft, and a pawl functioning eccentric rod for intermittently actuating a ratchet on the secondary shaft.

Signed at Bristol, Rhode Island, this 10th day of December, 1919.

THOMAS B. HUESTIS.